(12) United States Patent
Bellacicco et al.

(10) Patent No.: US 8,131,606 B2
(45) Date of Patent: Mar. 6, 2012

(54) MODEL, DESIGN RULES AND SYSTEM FOR ASSET COMPOSITION AND USAGE

(75) Inventors: John A. Bellacicco, Stamford, CT (US); Kumar Bhaskaran, Englewood Cliffs, NJ (US); Robert A. Hood, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/673,434

(22) Filed: Feb. 9, 2007

(65) Prior Publication Data
US 2008/0195509 A1    Aug. 14, 2008

(51) Int. Cl.
*G06Q 40/00* (2006.01)
(52) U.S. Cl. ........................................ 705/28; 705/36 R
(58) Field of Classification Search ................... 705/28, 705/36 R
See application file for complete search history.

(56) References Cited

U.S. PATENT DOCUMENTS

| | | | |
|---|---|---|---|
| 2002/0078041 A1* | 6/2002 | Wu | 707/4 |
| 2002/0078300 A1* | 6/2002 | Dharap | 711/133 |
| 2003/0182470 A1* | 9/2003 | Carlson et al. | 709/328 |
| 2003/0233544 A1* | 12/2003 | Erlingsson | 713/167 |
| 2004/0153968 A1* | 8/2004 | Ching et al. | 715/513 |
| 2006/0230283 A1* | 10/2006 | McBride et al. | 713/184 |
| 2007/0033090 A1* | 2/2007 | Connors et al. | 705/9 |
| 2007/0250410 A1* | 10/2007 | Brignone et al. | 705/28 |
| 2008/0082982 A1* | 4/2008 | Benedetti et al. | 718/104 |
| 2008/0126406 A1* | 5/2008 | Endabetla et al. | 707/103 R |
| 2008/0294486 A1* | 11/2008 | Connors et al. | 705/8 |

* cited by examiner

*Primary Examiner* — Jagdish Patel
*Assistant Examiner* — Kevin Poe
(74) *Attorney, Agent, or Firm* — August Law LLC; George Willinghan

(57) ABSTRACT

Systems and methods are provided for the management of assets within an enterprise. Management of assets includes the creation of assets, the derivation and lineage of assets and asset composition. In addition, the creation of artifacts by the assets is provided. Assets and artifacts are maintained within a repository that is accessible throughout the enterprise. In addition, rules are provided for the composition and usage of all assets within the enterprise.

20 Claims, 7 Drawing Sheets

MODEL, DESIGN RULES AND SYSTEM FOR ASSET COMPOSITION AND USAGE

FIELD OF THE INVENTION

The present invention relates to asset management systems.

BACKGROUND OF THE INVENTION

Businesses and enterprises employ a labor-based approach to projects and client requests. For example, given a client request or client job, the necessary labor within the enterprise is identified and assigned to that request. The ability to meet client demands at any given time is based upon having the correct amount and type of labor available. In addition, management of products and responses to client requests involves management of labor resources. This approach, however, does not provide for the most efficient and effective use of asset resources within a company. Assets may be underutilized and are often not adequately tracked and managed so that improvements in one asset are communicated to all users of that asset. In addition, there may be duplication of efforts among the various labor groups for example creating or duplicating assets that could be shared.

Although enterprises have not employed an overall, unified asset-based approach to meeting client demands, tools do exist for managing specific groups of assets within an enterprise. Systems are available to monitor a given class of assets within an enterprise for purpose of inventory control or accounting. These systems, however, are directed to a single type of resource and to a particular asset management need. For example, asset management systems are available for the management or tracking of hardware, e.g. laptop computers, within an enterprise. Other systems manage the physical plant, e.g. buildings, of an enterprise. Yet other systems manage software assets and provide repositories, libraries or tools that can be used in software development. Asset-based approaches to client problems and projects would require management of all assets within the enterprise. Systems and methods are needed that manage all assets within an enterprise including service or labor assets. This management should provide for rules governing the production and consumption of a wide variety of resources within an enterprise.

SUMMARY OF THE INVENTION

Systems and methods in accordance with the present invention provide for asset management within any enterprise and in particular in globally integrated enterprises. As used herein, an enterprise includes, but is not limited to, any business or collection of businesses, organizations or governmental agencies or groups and combinations thereof. Asset management for the composition and usage of assets utilizes a set of high level fundamental rules to which the management of all types of assets adhere. These fundamental rules are governance policies and technical guidelines for how assets can be used individually, for example by members or systems within the enterprise, and in combination with other assets. In general, assets include any type of asset, resource or work-product available to, created by or utilized by the enterprise including, but not limited to, software, work products, for example documents or program code created as part of a client request or solution engagements, service elements that constitute a solution to a problem for a given context, hardware resources such as computing systems, physical inventory, physical resources such as buildings and equipment, personnel and combinations thereof.

The asset management system and prescribed fundamental rules are founded on principles of modularity governing how new assets are derived from existing assets, substitution among the assets and the semantics of relationships among assets. Therefore, the management system and fundamental rules provide for improved utilization of assets within a given enterprise to optimize the use of assets, to minimize waste and to prevent duplication of efforts. These fundamental rules are then embodied in method-ware, for example the Rational Method Composer, through an asset-based development plug-in as well as in tool mentors, for example the Asset Packaging Tool, to ensure conformance to design rules. The invention is agnostic to solution domains and is broadly applicable for asset-based solutions and services.

In one embodiment, the present invention is directed to an asset management system that includes a repository containing a plurality of assets. Each asset is a reusable resource capable of assisting in providing a solution to a client request. These assets include, but are not limited to, hardware assets, software assets, services assets, skilled labor assets, facilities assets, document assets, policy assets and combinations thereof. The repository also includes a plurality of manifests. Each manifest is a listing of structures and elements for one of the assets contained in the repository.

The system also includes a rule enforcement mechanism in communication with the repository of assets. This rule enforcement mechanism includes a database of fundamental rules applicable to the composition and usage of all assets in the repository of assets and a computing system in communication with the database of rules. The computing system is capable of evaluating assets in the repository of assets for compliance with the fundamental rules. In one embodiment, the database of fundamental rules includes at least one rule governing asset derivation and asset lineage within the asset management system. In another embodiment, the database of fundamental rules includes at least one rule governing artifact creation within the asset management system wherein an artifact is created in the context of an asset and is strictly contained-by-value within that asset. In another embodiment, the database of fundamental rules includes at least one rule governing relationships between assets. These relationships include asset-asset compositions. In one embodiment, the database of fundamental rules includes at least one rule governing asset substitution within the asset management system. In another embodiment, the database of fundamental rules includes at least one rule governing asset instantiation.

In one embodiment, the rule enforcement mechanism of the system includes a client interface in communication with at least one client. The rule enforcement mechanism is capable of receiving requests from one or more clients and of retrieving assets from the library in response to the client requests. In addition, the computing system is capable of initiating instances of assets contained within the repository of assets.

The present invention is also directed to a method for the management of assets within an enterprise. In accordance with this method, a repository of assets is maintained in accordance with a plurality of pre-defined fundamental rules applicable to the composition and usage of all assets within the enterprise. Maintenance of the repository in accordance with the plurality of rules includes deriving new assets from one or more existing assets. In one embodiment, the derivation of the new asset does not affect the assets from which it was derived. In addition, each new asset is maintained as at least one of an independent asset having no lineage between the new asset and the assets from which it was derived, a dependent asset wherein the new asset must accept any change made in the assets from which it was derived and an optionally independent lineage wherein the new asset is notified of any changes in the assets from which it was derived and these changes may be accepted or ignored.

In one embodiment, maintenance of the repository in accordance with the plurality of rules includes creating artifacts within the context of a single one of the assets maintained within the repository of assets. Ownership of the artifact is inherited from ownership of the single asset in which that artifact was created. In one embodiment, maintenance of the repository in accordance with the plurality of rules includes deriving artifacts from existing artifacts. In one embodiment, each asset-asset composition is maintained in accordance with a unique relationship defined by the assets in a given asset-asset composition. This unique relationship represents a technical service agreement and a business service agreement.

In one embodiment, substitution between an existing asset and a replacement asset is permitted, for example if and only if the replacement asset meets the requirements of the relationship specified any technical service agreement applicable to the existing asset. In one embodiment, instances of assets are created in response to client requests. In addition, new assets are harvested for inclusion in the repository of assets.

DETAILED DESCRIPTION

Figure 1:
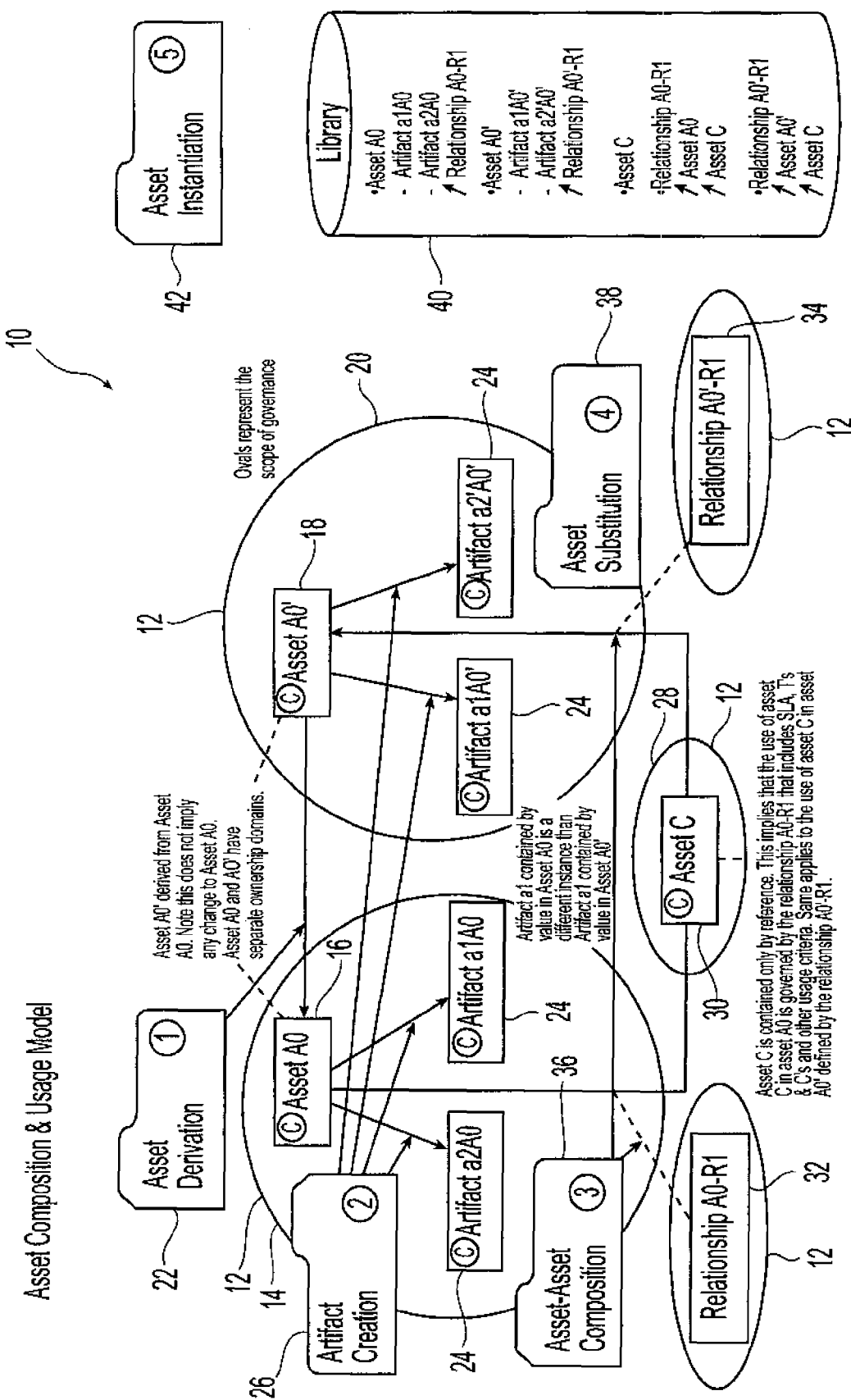
FIG. 1 is a representation of an embodiment of an asset composition and usage model in accordance with the present invention.

Exemplary embodiments of the present invention define fundamental rules of asset management in an enterprise. These fundamental rules enable the management and evolution of assets in any asset management system within an enterprise that supports a global community of users with business and technical backgrounds and roles. As used herein, an asset refers to reusable assets that provide a solution to a problem for a given context. Each asset may have one or more variability points, which are locations in the asset that may have value provided or customized by the asset customer. The asset has rules for usage that are the instructions describing how the asset should be used. Suitable assets include, but are not limited to, hardware such as computing systems, servers, hardware components such as cards and chips, software and software development tools, personnel or labor resources, documents, services and physical resources. Preferably, all assets conform to accepted standards in terms of meta-data, taxonomy and documentation.

In one embodiment, the determination of what is an asset depends on a given governance model. Since an asset is a unit-of-reuse that is governed over its lifecycle, an enterprise treats objects or resources that it will provide lifecycle long control or governance over in accordance with a given governance model as assets. Objects and resources that are not so governed are not assets under that governance model. In one embodiment, changes or modifications in governance models affect the definition of assets. In addition, different governance models can treat the same objects or resources differently, with one governance model treating a given object as an asset and another governance model not treating the same object as an asset. In one embodiment, a given asset is derived from other assets. For example, a new computer program derived from one or more existing computer programs. Alternatively, the new asset can be a new or updated version or an existing computer program. The asset from which another asset is derived is called a source asset, and the asset that has evolved from or has been created based upon another asset is referred to as a derived asset. The description of an asset, i.e. source or derived, is contained within an asset manifest that describes the structure and elements of an asset, i.e., the bill of materials of an asset. In general, the manifest is any set or list of the structure and elements of an asset. Manifests can be created, expressed, maintained and associated with assets using any suitable method.

Work products from the development lifecycle of a given asset, for example requirements documents, models, source code files, deployment descriptors, test cases and scripts are referred to as artifacts. Artifacts are created by and for all types of assets including software assets, hardware assets, services assets, personnel assets and infrastructure assets.

Users with specific roles in the life cycle of assets participate in the asset management system through an asset portal. This portal allows the users to access and to download assets for use as well as to submit assets for consideration in the asset management system and to change or to modify existing assets. In addition, users can browse, search or track assets and can produce or consume assets. In order to deliver value to clients, the cost associated with assets and the time to produce or to manage these assets is minimized, while the quality of the assets is maximized. Asset management systems in accordance with the present invention include libraries or repositories, governance and tools to support the use of assets for the entire lifecycle of each asset. As used herein, a repository includes a database or other suitable storage system, including persistent storage systems, for retaining data in an accessible format.

In exemplary embodiments of the asset management system, a plurality of design rules are provided that enable the orderly evolution, i.e. creation, modification and derivation, of assets and that provide common rules for asset management, an asset portal, asset tools for supporting the asset lifecycle, governance processes and an asset library. These design rules are asset management policies covering the governance model or the enterprise that is being governed and provide context for how the enterprise is to be governed. The asset management system includes a global asset realm that contains a plurality of governance realms. Each governance realm is a business defined administrative domain for asset management. In one embodiment, the design rules are global or fundamental design rules of a global governance model covering the global asset governance realm. Therefore, all assets regardless of the particular governance realm under which the asset is contained adhere to the global design rules. In one embodiment, the design rules are realm specific and cover assets contained within a particular governance model defined in terms of roles, scope, processes and metrics.

In general, the fundamental rules for any role-based governance of assets cover asset derivation and lineage, asset-asset composition, asset substitution, asset instantiation and artifact creation. These rules impact both the consumption and production of assets. When assets are consumed, the rules provide guidance on how the assets can be instantiated such as the points-of-variability permitted in using the assets as well as the aspects of the assets that can be substituted. When assets are produced, the rules provide composition rules for building new assets from combinations of existing assets.

A variety of tools are used to produce and to consume assets, and these tools in producing and consuming assets adhere to the fundamental rules of the asset management system. One exemplary tool is used to package content into assets. This tool directly implements the asset management rules as validation of the composition. Similarly, asset consumption tools, for example the Rational Software Modeler, adhere to rules covering asset relationships. Processes in the asset management system govern the lifecycle of assets, e.g., the review and approval of candidate assets, and the rules serve as the business policies in such processes. Assets that are in the asset management system are persisted based on the asset information model, i.e., metadata that helps to represent assets structurally and to categorize assets. The rules have a direct impact on the asset metadata in determining the metadata required for asset governance policies.

Referring to FIG. 1, an exemplary embodiment of an asset composition and usage model 10 in accordance with the present invention is illustrated. In particular, the application of five categories of fundamental rules defined by the asset management system of the present invention within the model and used to manage the composition and usage of assets is illustrated. The model includes a plurality of distinct ownership domains 12. Each domain can contain assets, artifacts and relationships or composition information. A first domain 14 contains Asset A0 16, which is a source asset. Asset A0' 18 is derived from Asset A0 and is located in a second domain 20. Therefore, Asset A0' 18 is a derived asset, and the derivation of this asset from Asset A0 16 is conducted in accordance with one of the five categories of fundamental rules, the asset derivation rules 22 of the asset management system. In addition, both source asset and the derived asset create artifacts 24. The creation of each one of these artifacts is governed by the artifact creation rules 26 of the asset management system. In a third domain 28, a composition asset 30 is contained by reference. Asset A0 16 and Asset A0' 18 are composed using the composition asset 30. Therefore, the composition asset 30 represents an asset-asset composition. The semantics of the use of the composition asset 30 in Asset A0 16 is defined by a first relationship 32, and the semantics of the use of the composition asset 30 in Asset A0' 18 is defined by a second relationship 34. In one embodiment, these relationships are assets and are maintained in separate domains. In addition, the relationships adhere to the asset-asset composition rules 36 of the asset management system. If one asset is going to be exchanged or substituted for another asset, this substitution adheres to the asset substitution rules 38 of the asset management system. At least one library 40 is provided to store the descriptions, i.e. manifests, of the assets, the asset-asset compositions and the relationships defining the use of the asset-asset compositions. A given instance of any defined asset is created in accordance with the asset instantiation rules 42 of the asset management system. As used herein, the instance of the asset refers, for example, to a specific usage of that asset, and instantiation refers to the creation of that usage. Therefore, the five fundamental rules control asset composition and asset usage in the model.

Figure 2:
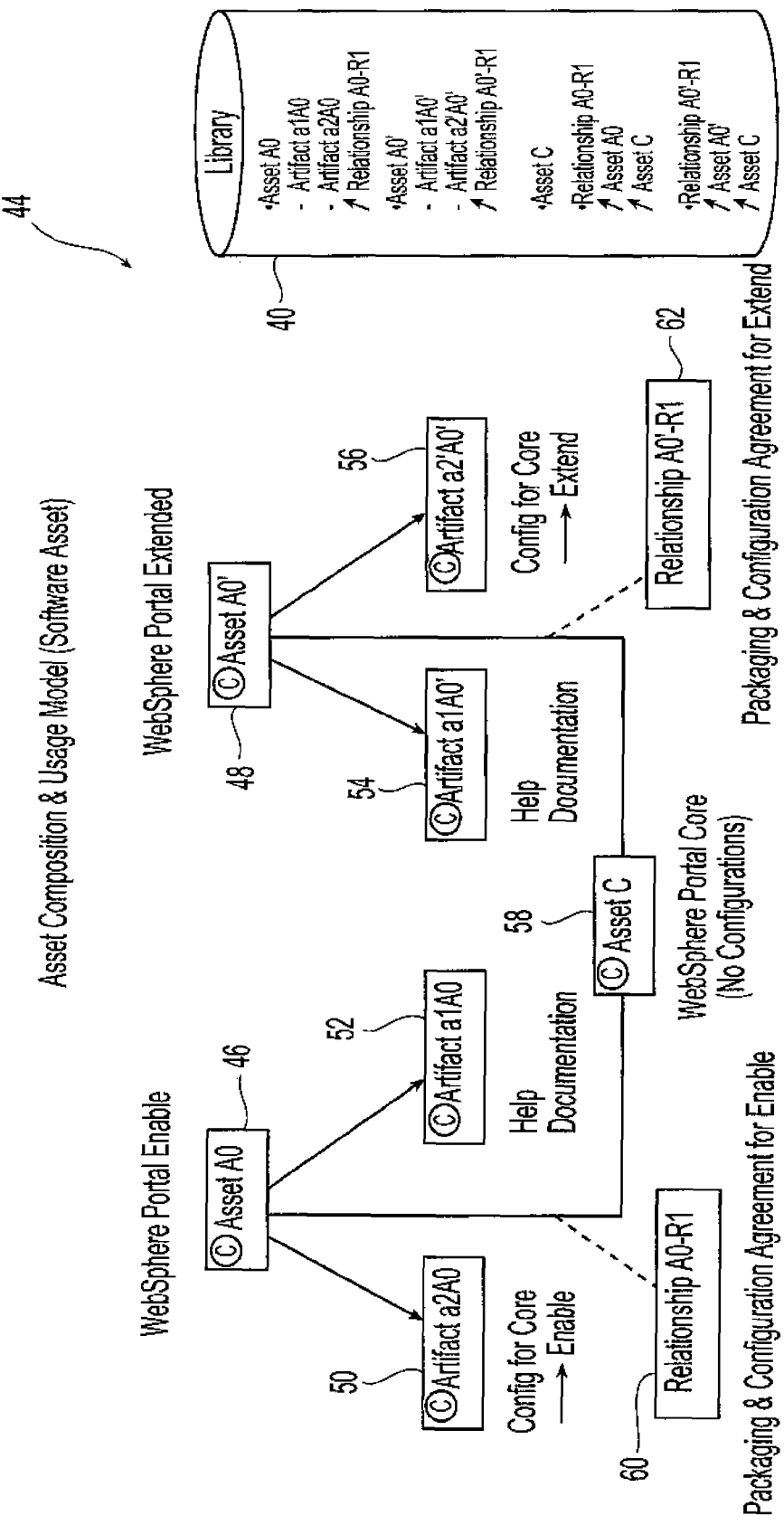
FIG. 2 is a representation of an embodiment of a software asset composition and usage model.

Referring to FIG. 2, an exemplary embodiment of the asset composition and usage model for a software application 44 is illustrated. A first software asset 46 is provided called WebSphere Portal Enable, and a second software asset 48 is provided called WebSphere Portal Extended. The first software asset 46 utilizes a configuration artifact 50 and a help documentation artifact 52. Similarly, the second software asset 48 utilizes a configuration artifact 56 and a help documentation artifact 54. The first and second software assets are the larger software offerings that contain the configuration and help documentation artifacts. In addition, both assets also contain a third asset 58 called WebSphere Portal Core. The third asset 58 is utilized by the first software asset 46 in accordance with a first relationship 60, and the third asset 58 is utilized by the second software asset in accordance with a second relationship 62. All of the manifests and necessary information is contained in the library 40.

Figure 3:
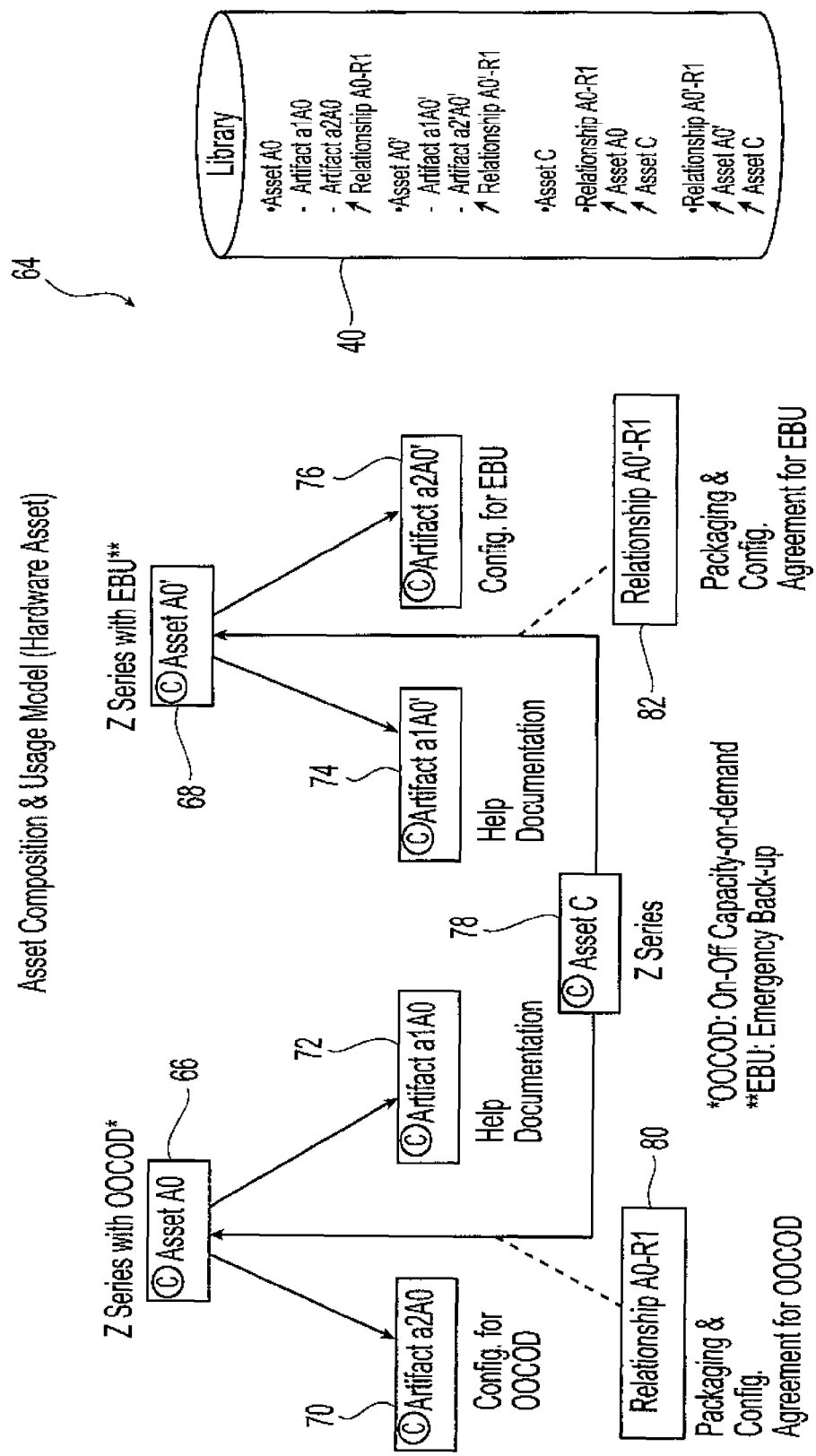
FIG. 3 is a representation of an embodiment of a hardware asset composition and usage model.

Referring to FIG. 3, an exemplary embodiment of the asset composition and usage model for a hardware application 64 is illustrated. A first hardware asset 66 is provided called Z Series with On-Off Capacity-On-Demand (OOCOD), and a second hardware asset 68 is provided called Z Series with Emergency Back-up (EBU). The first hardware asset 66 contains configuration artifact 70 and a help documentation artifact 72. Similarly, the second hardware asset 48 contains a configuration artifact 76 and a help documentation artifact 14. Both of these assets are larger hardware offerings that also contain a third asset 78 called Z Series. Therefore, both of these assets are part of a larger or combine asset, i.e. an overall hardware offering. The third asset 78 is utilized by the first hardware asset 66 in accordance with a first relationship 80, and the third asset is utilized by the second hardware asset 68 in accordance with a second relationship 82. All of the manifests and necessary information is contained in the library 40.

Figure 4:
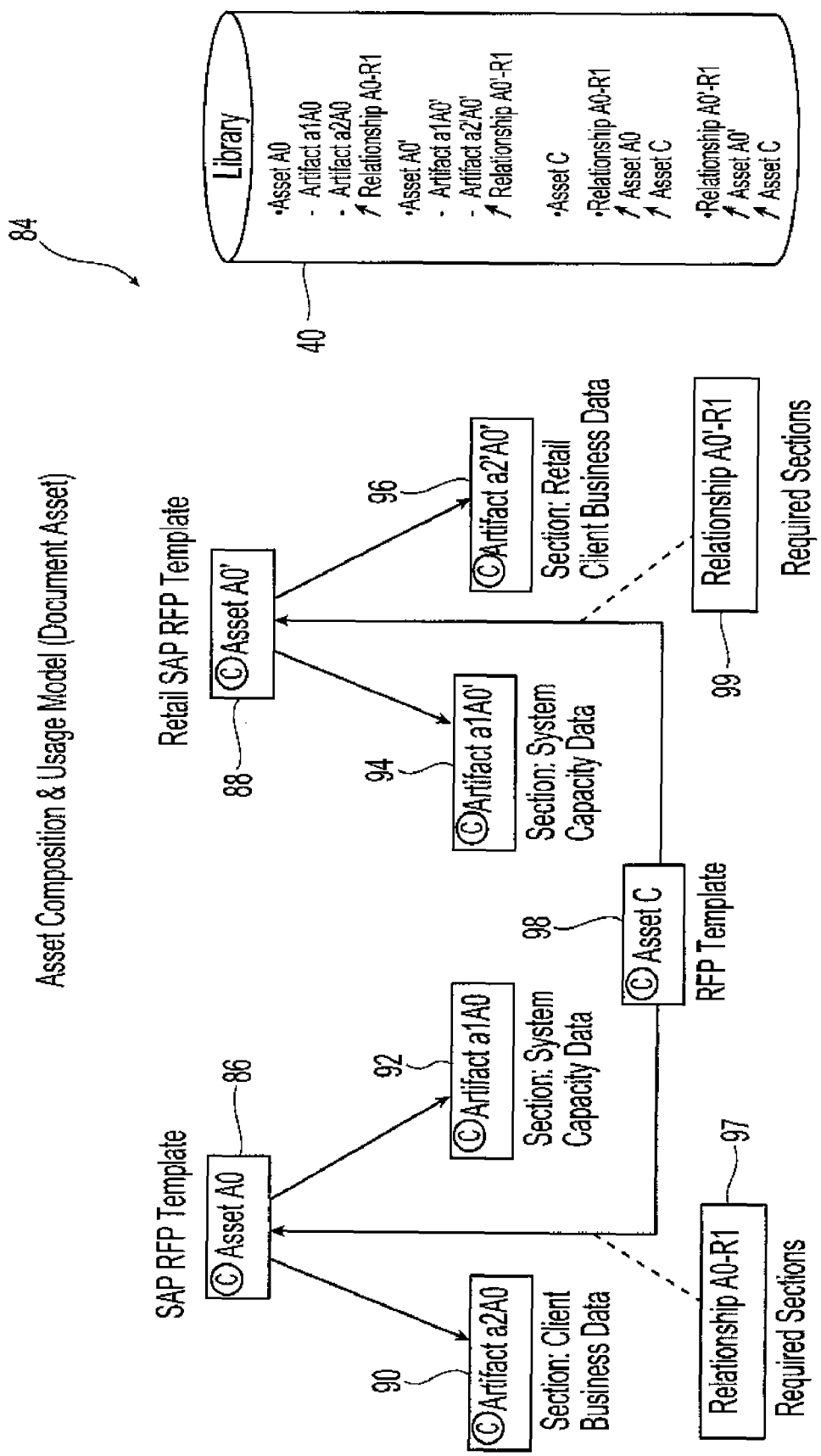
FIG. 4 is a representation of an embodiment of a document asset composition and usage model.

Referring to FIG. 4, an exemplary embodiment of the asset composition and usage model for a document asset application 84 is illustrated. A first document asset 86 is provided called SAP RFP Template, and a second document asset 88 is provided called Retail SAP RFP Template. The first document asset 86 includes a client business data section artifact 90 and a system capacity data section artifact 92. Similarly, the second document asset 88 includes a system capacity data section artifact 94 and a retail client business data section artifact 96. That is, the artifacts are sections of the document. Both of these assets in composition include a third asset 98 called RFP Template. Therefore, both of these assets are part of a larger or combine asset, i.e. a larger document, in this case an overall template. The third asset 98 is utilized by the first document asset 86 in accordance with a first relationship 97, and the third asset 98 is utilized by the second document asset 88 in accordance with a second relationship 99. All of the manifests and necessary information is contained in the library 40.

A first fundamental rule of asset management covers the derivation and lineage of assets within the asset management system. In accordance with this rule, an asset may be derived from any other asset. The derived asset can be within the same domain, i.e. have the same owner, as the source asset or can be located within a separate domain, i.e. have a different owner than the source asset. The derivation of a new asset does not affect the source asset from which it was derived, and the source asset remains as an asset in the asset library without change. Lineage refers to any ongoing relationship between the source asset and the derived asset. With regard to lineage, the derived asset can be an independent asset with no lineage between the source asset and the derived asset. Therefore, changes in the source asset are not binding on and need not be communicated to the derived asset for either acceptance or approval. Alternatively, the derived asset can be a dependent asset, and the derived asset must accept any change made in the source asset from which it was derived. Therefore, the derived asset is a controlled asset and is modified or updated in accordance with updates to the source asset. A third type of lineage provides for an optionally independent lineage. This lineage constraint can be mandated by the owner or domain of either the source asset or the derived asset. The optionally independent lineage provides that the source asset owner must notify the derived asset owner of any change to the source asset, and the derived asset owner can accept or ignore the communicated change as desired. These lineage constraints apply to both assets and asset instances. In one embodiment, the notification of changes in the source asset as required by either the dependent or optionally independent lineage is triggered by a change in the source asset manifest.

Returning to FIG. 1, Asset A0' 18 was derived from Asset A0 16. In one example, Asset A0 is a preconfigured total storage system containing hardware and software components necessary to manage the information lifecycle for information critical to a given regulatory compliance including environmental, labor and business regulations. Derived Asset A0' contains a subset of the hardware and software components of Asset A0, and can be viewed as an express version of Asset A0. The lineage between the assets is dependent, and a change in Asset A0 implies a change in Asset A0'.

A second fundamental rule of asset management covers the creation of artifacts within the asset management system. In accordance with this rule, an artifact is created in the context of an asset. Therefore, ownership of an artifact is inherited from ownership of the asset in which it was created, and an artifact is strictly contained-by-value within an asset, that is artifacts do not exist independent of the asset. The domain or user that owns a given asset owns the artifacts created in the context of that asset, e.g. created during the creation or use of that asset. A given artifact is governed by the asset governance and does not have business value without the asset it supports. Any given artifact is owned by a single asset, and no artifact is owned by more than one asset. In addition, although one artifact can be derived from an existing artifact, there is no lineage among artifacts. If an artifact is changed beyond prescribed limits or points of variability, then the artifact is replaced, and the asset manifest is changed accordingly.

As illustrated in FIG. 1 Artifact a1A0 when created in the context of Asset A0' 18, and renamed to a1A0', is owned by the owner of Asset A0' as opposed to the owner of Asset A0 from which Asset A0' was derived. Artifact a1A0 in Asset A0 16 and artifact a1A0' in Asset A0' 18 are two different instances of the same artifact and hence two different artifacts. Artifact a2'A0' although generated from artifact a2A0, for example, has no lineage maintained with a2A0. Since any given artifact is created in the context of an asset and owned solely by that asset, two assets, even two assets related as source asset and derived asset can have identical but distinct artifacts.

Asset management systems in accordance with the present invention also contain rules covering relationships among assets. As used herein, a relationship is an asset that associates two other assets in a contract that is a negotiated consumer-provider association defined, for example, by a technical service agreement (TSA) and a business service agreement (BSA). These agreements specify the obligations and rights of each asset in the relationship. A TSA covers the technical requirements of a relationship and contains, for example, the functional interface (service definitions), manageability interface (administrative functions), technical prerequisites (e.g. hardware and software requirements), quality of service (QOS) and quality of protection (QOP) among other factors. The attribute vector and associated range of attribute values for a TSA are supplied by the provider asset and consumer asset from their respective asset profiles. The actual attribute values of the TSA are then negotiated between the provider asset and the consumer asset. The TSA includes both functional and non-functional technical requirements. The BSA covers the non-technical aspects of the relationship and contains service level agreements (SLAs), terms and conditions (Ts & Cs) including intellectual property (IP) rights and a reference to the TSA. The BSA becomes a contract once it is made binding with applicable local and regional constraints. The attribute vector and associated range of attribute values for a BSA are supplied by the provider asset and the consumer asset from their respective asset profiles. The actual attribute values of the BSA are then negotiated between the provider asset and the consumer asset. The BSA contains non-functional requirements.

Relationship assets represent a contract between a service provider and a service consumer and have well defined points of variability. Ownership and management of the negotiation in a relationship is determined by the business model of the relationship. In one embodiment, the relationship is jointly owned by the owners of the two assets it is associating. In the reusable asset specification (RAS), for example, the relationship is a technical association among multiple objects as opposed to a business level relationship as addressed here. The contract is the instantiation of a relationship's BSA.

An example of the use of a TSA and a BSA in an asset relationship is the outsourcing of credit checks in a loan application. The client or consumer asset is the enterprise providing the loan or taking the application. The provider asset is the credit checking enterprise. The TSA addresses the consumer asset requirements, both functional and non-functional, for the credit check service provided by the credit checking enterprise. The BSA defines the business requirements of both the consumer asset and the provide asset including how the credit check information is to be provided and how the credit check information can be used. The TSA and BSA are communicated during the negotiating period between the consumer asset and the provider asset. During run time, the TSA provides for inputs (e.g. an order for a credit check), outputs (e.g. credit verification), formats (e.g. extensible mark-up language), protocols (e.g. REST web service), QOS metrics (e.g. response time) and QOP (e.g. user authentication and authorization). The BSA monitors service level expectations (e.g. response time<prescribed limit), T's & C's (transaction pricing $/hit) and IP rights (e.g. services cannot be modified in any form).

The third fundamental rule of the asset management system governs relationships between assets and in particular asset-asset compositions. Asset-asset composition is containment-by-reference and is uniquely defined by a relationship between the assets. A given asset, however, can have relationships with multiple assets. As illustrated in FIG. 1, the third asset 30 is contained-by-reference in asset A0 16 and asset A0' 18. The third asset 30 participates in multiple relationships, the asset relationship A0-R1 32 as well as the asset relationship A0'-R1 34, which have specific and different TSA's and BSA'S. An example of an asset relationship following the asset-asset composition rule can be illustrated with reference to FIG. 2. The WebSphere Portal Core asset 58 is contained within the WebSphere Portal Enable asset 46. The association between these two assets is defined by the relationship A0-R1 60, which is an asset that provides the packaging and configuration agreement covering this association.

The fourth fundamental rule of the asset management system covers another aspect of asset relationships—asset substitution. In accordance with this rule, any two assets are considered similar and substitutable in the context of a relationship, if and only it both assets meet the requirements of the relationship specified in the TSA. However, the BSA is renegotiated following substitution. Substitution is an N-ary relationship that supports strictly OR substitution. Substitution utilizing AND in the N-ary relationship, e.g. C OR {D AND E}, is not permissible as it implies an asset composition that is outside the scope of the definition of the relationship. The third asset 30 of FIG. 1 can be substituted with any other asset within the prescribed context of the relationship A0-R1 32 as long as the substituted asset maintains the same TSA with Asset A0 16. The third asset 30 can be substituted with a third asset, a fourth asset or a fifth asset, in the context of relationship A0'-R1 as long as each one of these assets maintains the same TSA with Asset A0' 18. As example of an asset substitution relationship following the asset substitution rule can be illustrated with respect to a collections asset that is a provider asset to a loan asset that is a consumer asset. A first collection asset, i.e. a first collections agency, that provides collection services to the loan asset can be substituted by a second collection asset so long as the technical service agreement is satisfied, i.e. the second collection asset can provide the necessary services to the loan asset. The BSA between the loan asset and the second collection asset is renegotiated.

The fifth fundamental rule covers asset instantiation and asset harvesting. Asset instantiation refers to instances of an asset that have been created, i.e. configured and deployed, in response to user requests or as needed to meet client demands. Therefore, an asset instance is the form of an asset that has been instantiated for a particular use such as to provide a specific function in a real client engagement. In one embodiment, an asset instantiation includes permissible configuration changes and does not imply that all components be instantiated at the same time. Referring to FIG. 3, in one example, the Z-series asset 78 includes the Z-series with OOCOD asset 66 and the Z-series with EBU asset 68. The Z-series packing and configuration agreement rules define the relationships between the Z-series asset and each one of the other assets. Instantiating the Z-series asset implies configuring the Z-series and instantiating its components as required. Highly effective asset instances are documented and stored in the library to be used as a reference for future instantiations for example by engagement teams. These highly effective asset instances are referred to as reference implementations. A reference implementation is used for instantiating assets, and all fundamental rules for assets apply.

Figure 5:
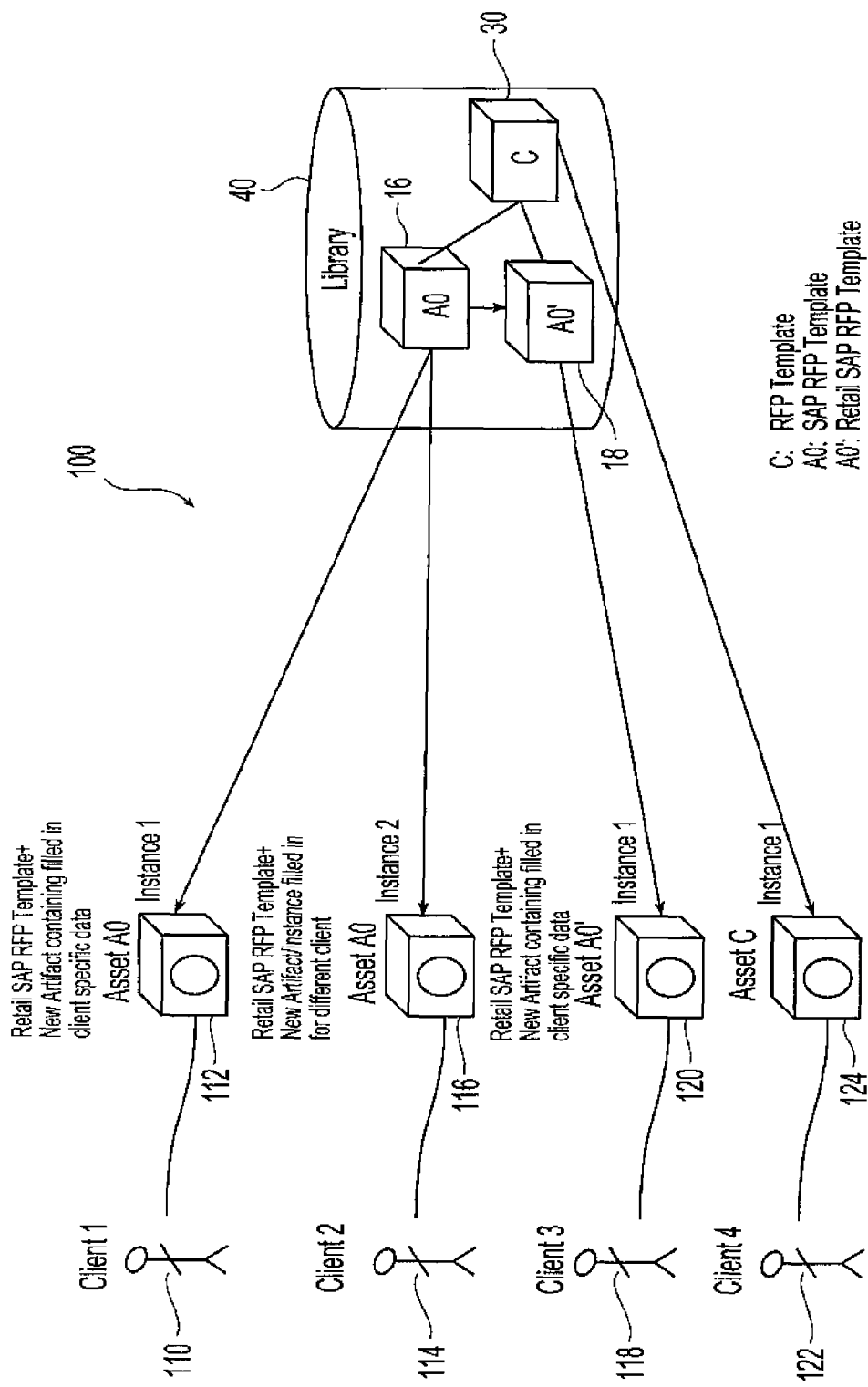
FIG. 5 is a representation of an embodiment of asset instantiation in accordance with the present invention.

Referring to FIG. 5, an exemplary embodiment of asset instantiation 100 in accordance with the present invention is illustrated. As illustrated, the assets of FIG. 1 are used. Asset instantiations are generated in response to client requests. Suitable clients include, but are not limited to, users, system administrators, computing systems and applications running on computing systems. A first client 110 requests an instance of Asset A0 16, and a first instance of Asset A0 112 is created. As illustrated, Asset A0 is an SAP RFP Template, and the first instance 112 includes an artifact containing data specific to the first client 110. A second client 114 also requests an instance of Asset A0 16. This produces a new, concurrent second instance of Asset A0 116, and this second instance includes a new artifact containing data specific to the second client 114. A third client 118 requests an instance of a separate asset, Asset A0' 18. A first instance 120 of asset A0' 18 is created, and an artifact with data specific to the third client 118 is created for this instance. A fourth client 122 requests and instance of Asset C 30, and a first instance of Asset C 124 is produced. All of these assets can be created and exist concurrently. These asset instances maintain the necessary relationships with other assets. Additional asset instances can also be created either for the same clients or for additional clients.

The fifth fundamental rule covers asset instantiation. In accordance with this rule, the configuration of an asset at the time of instantiation includes permissible changes as defined by the points-of-variability in the asset. Additionally, the existence of a relationship between two assets does not imply that both assets in the relationship are instantiated at the same time. The optional use of the associated asset can be a property of the relationship definition. Therefore, as illustrated in FIG. 5, a relationship exists between Asset A0 16 and Asset C 30; however, Asset A0 can be instantiated with no instantiation of Asset C or deferred instantiation of Asset C depending on the functionality of Asset C that is utilized in Asset A0.

Figure 6:
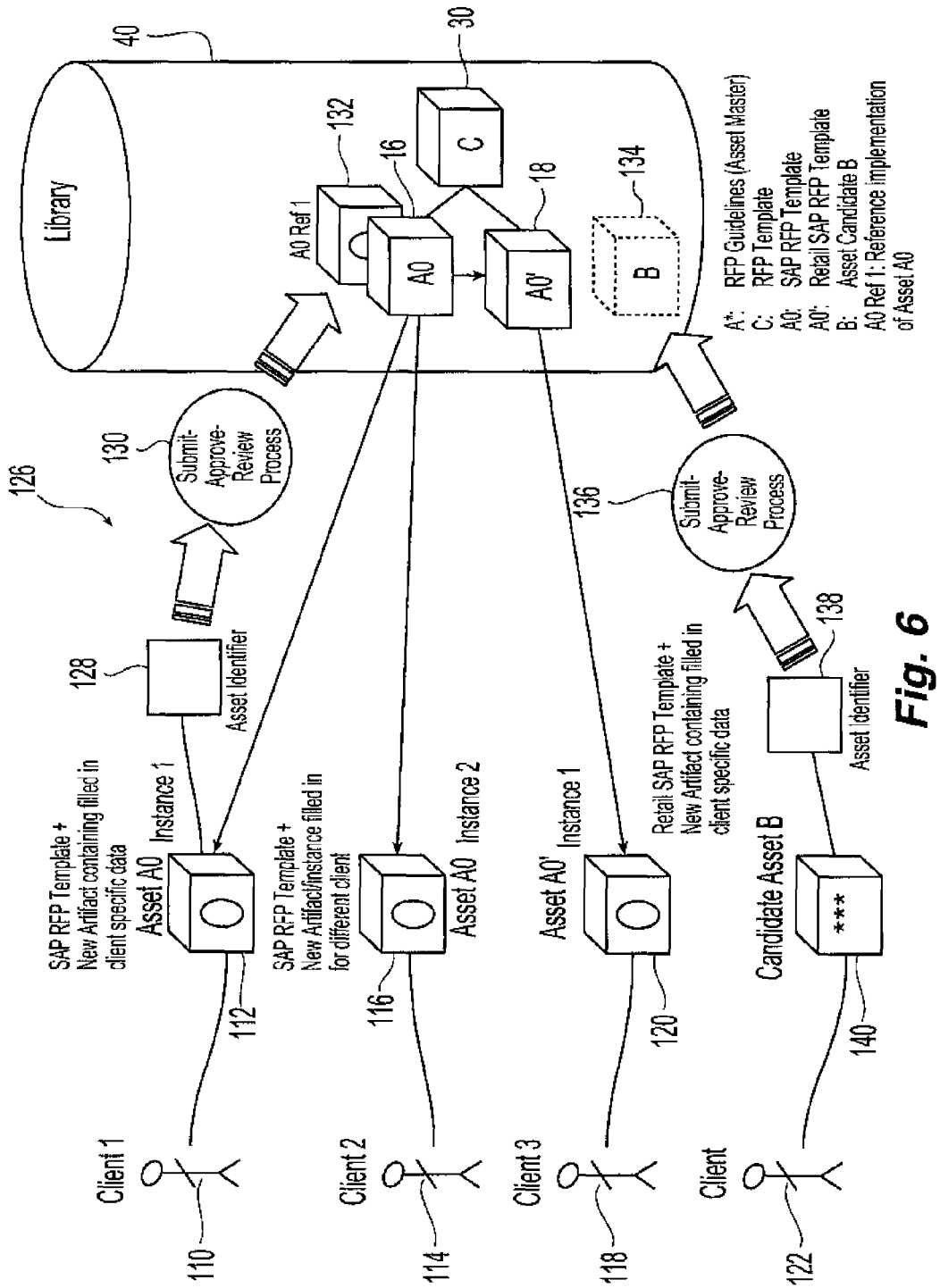
FIG. 6 is a representation of an embodiment of asset harvesting in accordance with the present invention.

Referring to FIG. 6, an exemplary embodiment of asset harvesting 126 in accordance with the present invention is illustrated. The first client 110 has requested and received an instance of Asset A0 112. This instance of Asset A0 is completed with data specific to the first data. An asset identifier 128 identifies the instance of Asset A0 as a potential submission for storage in the library. The identified asset is for review and approval 130 before being stored in the library. Once accepted, the asset instance is stored in the library 132, for example as a reference instance of Asset A0. Therefore, this asset instance would be stored for later use by other clients, for use as a source asset to produce derived assets and or use in asset compositions. Thus, assets can be harvested from instances of existing assets. Alternatively, assets can be harvested from assets submitted by third parties. As illustrated, the fourth client submits a candidate asset 140 to the asset identifier 138. Again the submitted asset is reviewed for approval 136. Once approved, the asset is contained within the library 134, or the associated asset manifest, for subsequent use.

Asset management systems for business and information technology (IT) solutions and services in accordance with the present invention can utilize a variety of assets including, but not limited to, hardware assets, software assets, services assets, skilled labor assets, facilities assets, document assets, policy assets and combinations thereof. The asset management system includes an information model that governs how assets relate to each other and supports the end-to-end activities in an asset lifecycle. A mechanism is provided to modularize assets for composition in services and solutions and a management system and library for managing and storing assets based on contractual relationships and scopes of governance. The asset management system includes fundamental rules regarding asset derivation and lineage, artifact creation, asset-asset compositions, asset substitution and asset instantiation.

Versioning of assets, i.e. the creation and use of new versions of assets is governed by the rules applicable to asset derivation and asset substitution. When a new version of an asset is created, the fundamental rules governing asset derivation apply. Therefore, lineage is maintained and the new version can be independent, dependent or optionally independent. When the new version of an asset is used, the fundamental rules governing asset substitution apply, since the new version is being substituted for the old version.

Figure 7:
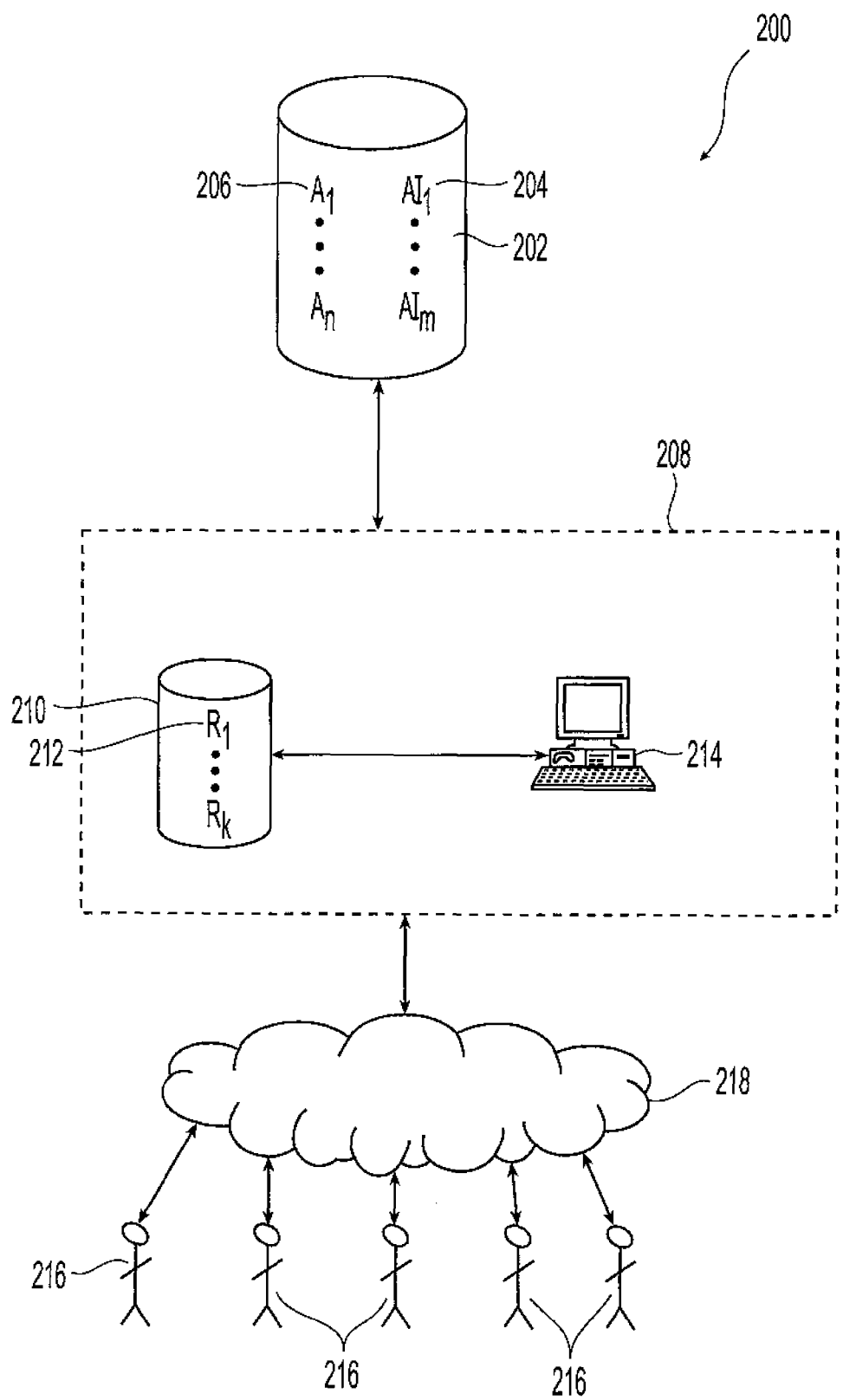
FIG. 7 is a schematic representation of an embodiment of an asset management system in accordance with the present invention.

Referring to FIG. 7, an exemplary embodiment of an asset management system 200 in accordance with the present invention is illustrated. The asset management system includes at least one repository 202, e.g. database of other storage medium, containing a plurality of assets 206 or asset instances 204. Each asset is created in accordance with the present invention and represents a reusable resource capable of assisting in providing a solution to a client request. As described herein, suitable assets include, but are not limited to hardware assets, software assets, services assets, skilled labor assets, facilities assets, document assets, policy assets or combinations thereof. In one embodiment, the repository includes a plurality of assets manifests. Each manifest is associated with one of the assets and includes a listing of structures and elements for one of the assets contained in the repository.

The asset management system also includes a rule enforcement mechanism 208 in communication with the repository of assets. The rule enforcement mechanism includes, a database 210 containing a plurality of pre-defined fundamental rules 212 that are applicable to the composition and usage of all assets 206 in the repository of assets 202. The rule enforcement mechanism also includes a computing system 214 in communication with the database of rules 210. The computing system is capable of evaluating assets in the repository of assets for compliance with the fundamental rules. Suitable computing systems are known and available in the art. In one embodiment, the rule enforcement mechanism also includes a client interface in communication with at least one or more clients 216 across one or more networks 218 including local area networks and wide area networks. Preferably, the client interface is incorporated into the computing system. Using the client interface, the rule enforcement mechanism is capable of receiving requests from one or more clients and of retrieving assets from the library in response to the client requests. In addition, the computing system can initiate instances of assets contained within the repository of assets, for example in response to client requests.

In one embodiment, the pre-defined fundamental rules include at least one rule governing asset derivation and asset lineage within the asset management system. In one embodiment, the pre-defined fundamental rules include at least one rule governing artifact creation within the asset management system. An artifact is created in the context of an asset and is strictly contained-by-value within that asset. In one embodiment, the pre-defined fundamental rules include at least one rule governing relationships between assets. These relationships include asset-asset compositions. In one embodiment, the pre-defined fundamental rules include at least one rule governing asset substitution within the asset management system. In one embodiment, the pre-defined fundamental rules include at least one rule governing asset instantiation.

In accordance with one exemplary embodiment of a method for the management of assets within an enterprise, a repository of assets are managed in accordance with a plurality of pre-defined fundamental rules applicable to the composition and usage of all assets within the enterprise. In one embodiment, maintenance in accordance with the rules includes deriving new assets from one or more existing assets such that the derivation of the new asset does not affect the assets from which it was derived. Each new asset can have its lineage structured as an independent asset, a dependent asset or an optionally independent asset. An independent asset has no lineage between the new asset and the assets from which it was derived. A dependent asset must accept any changes made in the assets from which it was derived. An optionally independent is notified of any changes in the assets from which it was derived, and these changes may be accepted or ignored by the owner of the new asset. In one embodiment, maintenance in accordance with the rules includes creating artifacts within the context of a single one of the asset maintained within the repository of assets. Ownership of the artifact is inherited from ownership of the single asset in which that artifact was created. In addition, new artifacts can be derived from existing artifacts.

In one embodiment, maintenance in accordance with the rules includes maintaining each asset-asset composition in accordance with a unique relationship defined by the assets in a given asset-asset composition. These relationships include a technical service agreement outlining the technical requirements of the relationship and a business service agreement outlining the business or performance aspects of the relationship. In one embodiment, maintenance in accordance with the rules includes permitting substitution between an existing asset and a replacement asset if and only if the replacement asset meets the requirements of the relationship specified any technical service agreement applicable to the existing asset. In one embodiment, maintenance in accordance with the rules includes creating instances of assets in response to client requests and harvesting new assets for inclusion in the repository of assets.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for the management of assets within an enterprise in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiments and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. An asset management system comprising:
a repository comprising a plurality of assets and a plurality of distinct and separate artifacts, each asset comprising a reusable resource within an enterprise that assists in providing a solution to a client request, the plurality of assets comprising at least two distinct types of assets, and each artifact is separate from the assets, comprises work product created by a given asset, exists only in the context of that asset and is owned by only that asset; and a rule enforcement mechanism in communication with the repository comprising the plurality of assets and artifacts, the rule enforcement mechanism comprising:
a database of fundamental rules applicable to all types of assets and artifacts in the repository of assets, the fundamental rules comprising governance policies and technical guidelines for how assets can be used individually and in combination with other assets; and a computing system in communication with the database of fundamental rules, the computing system evaluating assets and artifacts in the repository of assets for compliance with the fundamental rules.

2. The system of claim 1, wherein the plurality of assets comprise computing system hardware assets, software assets, services assets, skilled labor assets, facilities assets, document assets, and physical assets.

3. The system of claim 1, wherein the database of fundamental rules comprises at least one rule governing asset derivation and asset lineage within the asset management system.

4. The system of claim 1, wherein the database of fundamental rules comprises at least one rule governing artifact creation within the asset management system wherein an artifact is created in the context of an asset and is strictly contained-by-value within that asset.

5. The system of claim 1, wherein the database of fundamental rules comprises at least one rule governing relationships between assets, the relationships comprising asset-asset compositions.

6. The system of claim 1, wherein the database of fundamental rules comprises at least one rule governing asset substitution within the asset management system.

7. The system of claim 1, wherein the database of fundamental rules comprises at least one rule governing asset instantiation.

8. The system of claim 1, wherein the rule enforcement mechanism further comprises a client interface in communication with at least one client, the rule enforcement mechanism receiving requests from one or more clients and retrieving assets from the library in response to the client requests.

9. The system of claim 8, wherein the computing system further initiates instances of assets contained within the repository of assets.

10. A method for the management of assets within an enterprise, the method comprising:
using a computer comprising a rule enforcement mechanism to:
maintain a repository of assets and artifacts in accordance with a plurality of pre-defined fundamental rules applicable to all types of assets within the enterprise, each asset comprising a reusable resource within the enterprise that assists in providing a solution to a client request, the assets comprising at least two distinct types of assets, the artifacts comprising a plurality of distinct and separate artifacts that are separate from the assets and each artifact comprising a work product created by a given asset, exists only in the context of that asset and is owned by only that asset; and the pre-defined fundamental rules comprising governance policies and technical guidelines for how assets can be used individually and in combination with other assets; and to evaluate assets in the repository of assets and artifacts for compliance with the pre-defined fundamental rules.

11. The method of claim 10, wherein the step of maintaining the repository in accordance with the plurality of rules further comprises deriving new assets from one or more existing assets, wherein the derivation of the new asset does not affect the assets from which it was derived.

12. The method of claim 11, further comprising maintaining each new asset as at least one of an independent asset having no lineage between the new asset and the assets from which it was derived, a dependent asset wherein the new asset must accept any change made in the assets from which it was derived and an optionally independent lineage wherein the new asset is notified of any changes in the assets from which it was derived and these changes may be accepted or ignored.

13. The method of claim 10, wherein the step of maintaining the repository in accordance with the plurality of rules further comprises creating artifacts within the context of a single one of the asset maintained within the repository of assets, wherein ownership of the artifact is inherited from ownership of the single asset in which that artifact was created.

14. The method of claim 13, wherein the step of maintaining the repository in accordance with the plurality of rules further comprises deriving artifacts from existing artifacts.

15. The method of claim 10, wherein the step of maintaining the repository in accordance with the plurality of rules further comprises maintaining each asset-asset composition in accordance with a unique relationship defined by the assets in a given asset-asset composition.

16. The method of claim 15, wherein the unique relationship comprises a technical service agreement and a business service agreement.

17. The method of claim 10, wherein the step of maintaining the repository in accordance with the plurality of rules further comprises permitting substitution between an existing asset and a replacement asset if and only if the replacement asset meets the requirements of the relationship specified any technical service agreement applicable to the existing asset.

18. The method of claim 10, wherein the step of maintaining the repository in accordance with the plurality of rules further comprises creating instances of assets in response to client requests.

19. The method of claim 10, wherein the step of maintaining the repository in accordance with the plurality of rules further comprises harvesting new assets for inclusion in the repository of assets.

20. A repository comprising a plurality of assets comprising computing system hardware assets, software assets, services assets, skilled labor assets, facilities assets, document assets, and physical assets that represent reusable resources within an enterprise that assists in providing a solution to a client request and a plurality of distinct and separate artifacts, each artifact separate from the assets, comprising work product created by a given asset, exists only in the context of that asset and is owned by only that asset; and a rule enforcement mechanism in communication with the repository of assets, the rule enforcement mechanism comprising: a database of fundamental rules applicable to all types of assets and artifacts in the repository of assets, the fundamental rules comprising governance policies and technical guidelines for how assets can be used individually and in combination with other assets, and a computing system in communication with the database of fundamental rules, the computing system evaluating assets and artifacts in the repository of assets for compliance with the fundamental rules.

\* \* \* \* \*